(12) United States Patent
David et al.

(10) Patent No.: US 9,583,247 B2
(45) Date of Patent: Feb. 28, 2017

(54) SYSTEMS AND METHODS FOR A MAGNET WITH UNIFORM MAGNETIC FLUX

(71) Applicant: Allegro Microsystems, LLC, Worcester, MA (US)

(72) Inventors: Paul A. David, Bow, NH (US); Ryan Metivier, Nashua, NH (US)

(73) Assignee: Allegro MicroSystems, LLC, Worcester, MA (US)

( * ) Notice: Subject to any disclaimer, the term of this patent is extended or adjusted under 35 U.S.C. 154(b) by 101 days.

(21) Appl. No.: 14/287,469

(22) Filed: May 27, 2014

(65) Prior Publication Data
US 2015/0345990 A1    Dec. 3, 2015

(51) Int. Cl.
*G01D 5/14*       (2006.01)
*H01F 7/06*       (2006.01)
*H01F 7/02*       (2006.01)
*G01D 5/244*      (2006.01)

(52) U.S. Cl.
CPC ............... *H01F 7/06* (2013.01); *G01D 5/145* (2013.01); *G01D 5/24438* (2013.01); *H01F 7/0278* (2013.01)

(58) Field of Classification Search
CPC .......... G01B 7/14; G01B 7/146; G01R 33/00; G01D 5/12; G01D 5/14; G01D 5/16; G01D 5/24438; G01D 5/145; H01F 7/0278; H01F 7/06
USPC ....... 324/173, 174, 244, 251, 252, 260–262, 324/207.2; 257/427; 73/460, 462; 327/510, 511; 338/32 H, 32 R
See application file for complete search history.

(56) References Cited

U.S. PATENT DOCUMENTS

| 4,908,816 | A | * | 3/1990 | Champagne | ......... G11B 7/0929 310/12.01 |
| 5,781,005 | A |   | 7/1998 | Vig et al. | |
| 5,883,564 | A | * | 3/1999 | Partin | ..................... G01R 33/06 257/E43.003 |
| 5,998,989 | A | * | 12/1999 | Lohberg | ................... G01P 3/487 324/174 |
| 6,304,078 | B1 | * | 10/2001 | Jarrard | ................... G01B 7/003 324/207.2 |
| 7,046,000 | B1 | * | 5/2006 | Hara | ...................... G01D 5/147 324/207.25 |

(Continued)

FOREIGN PATENT DOCUMENTS

JP            08178937 A * 7/1996 ............. G01D 5/245

OTHER PUBLICATIONS

Shigehiro, Magnetism Detecting Device—Machine Translation, Jul. 12, 1996, Espacenet, JPH08178937(A), 1-10.*

*Primary Examiner* — Melissa Koval
*Assistant Examiner* — Rahul Maini
(74) *Attorney, Agent, or Firm* — Daly, Crowley, Mofford & Durkee, LLP

(57) ABSTRACT

A magnet includes a magnetic body having a length and width. The body has a first notch in one side and extending along at least a portion of the length of the body, and a second notch in an opposite side of the body extending along at least a portion of the length of the body. A magnetic field produced by the body has a substantially uniform magnetic flux along at least a portion of the length of the body. A system for detecting a target includes one or more magnetic field sensing elements positioned within the portion of the magnetic field having substantially uniform flux.

15 Claims, 5 Drawing Sheets

(56) References Cited

U.S. PATENT DOCUMENTS

| | | | |
|---|---|---|---|
| 7,250,760 B2* | 7/2007 | Ao | G01D 5/145 |
| | | | 324/252 |
| 8,368,496 B2* | 2/2013 | Voss | H01J 49/30 |
| | | | 335/296 |
| 8,713,809 B2* | 5/2014 | Ohmori | G01C 17/30 |
| | | | 33/361 |
| 8,729,892 B2* | 5/2014 | Friedrich | G01R 33/02 |
| | | | 324/247 |
| 8,813,264 B2* | 8/2014 | Boos | A41B 3/08 |
| | | | 2/132 |

* cited by examiner

SYSTEMS AND METHODS FOR A MAGNET WITH UNIFORM MAGNETIC FLUX

FIELD

This disclosure relates to magnets, and more particularly, magnets having a substantially uniform magnetic field suitable for use with magnetic field sensors.

BACKGROUND

Magnetic field sensors including a magnetic field sensing element, or transducer, such as a Hall Effect element or a magnetoresistive element, are used in a variety of applications to detect aspects of movement of a ferromagnetic article, or target, such as proximity, speed, and direction. Applications using these sensors include, but are not limited to, a magnetic switch or "proximity detector" that senses the proximity of a ferromagnetic article, a proximity detector that senses passing ferromagnetic articles (for example, magnetic domains of a ring magnet or gear teeth), a magnetic field sensor that senses a magnetic field density of a magnetic field, and a current sensor that senses a magnetic field generated by a current flowing in a current conductor. Magnetic field sensors are widely used in automobile control systems, for example, to detect ignition timing from a position of an engine crankshaft and/or camshaft, and to detect a position and/or rotation of an automobile wheel for anti-lock braking systems.

Magnets, in the form of a permanent magnet, or magnetically permeable structures, sometimes referred to as concentrators or flux guides, are often used in connection with magnetic field sensors. In applications in which the ferromagnetic target is magnetic, a magnetically permeable concentrator or magnetic flux guide can be used to focus the magnetic field generated by the target on the magnetic field transducer in order to increase the sensitivity of the sensor and, allow use of a smaller magnetic target, or allow the magnetic target to be sensed from a greater distance (i.e., a larger airgap). In other applications in which the ferromagnetic target is not magnetic, a permanent magnet, sometimes referred to as a back bias magnet, may be used to generate the magnetic field that is then altered by movement of the target.

If a back bias magnet is used, the magnetic field sensing elements used in an application for detecting a target are placed within the magnetic field formed by the back bias magnet. Thus, the magnetic field sensing elements detect changes in bias magnetic field caused by movement of the target.

Generally, back bias magnets, on their own, do not produce a uniform magnetic field across the area where the magnetic field sensing elements are positioned, particularly over temperature. If the magnetic field sensing elements are placed within a non-uniform magnetic field, each of the sensors may be subject to a different DC offset. Compensating for the different DC offsets requires additional circuitry or algorithms that can increase the cost of the magnetic field sensor. Thus, concentrators are sometimes used in conjunction with back bias magnets to reduce the non-uniformity of the bias field. However, concentrators add cost to the magnetic circuit and can reduce the minimum usable air gap.

SUMMARY

In an embodiment, a magnet includes a magnetic body having a length and width. The body has a first notch in one side and extending along at least a portion of the length of the body, and a second notch in an opposite side of the body extending along at least a portion of the length of the body. A magnetic field produced by the body has a substantially uniform magnetic flux along at least a portion of the length of the body. A system for detecting a target includes one or more magnetic field sensing elements positioned within the portion of the magnetic field having substantially uniform flux.

In another embodiment, a system comprises a magnet for producing a magnetic field having a substantially uniform magnetic flux along at least a portion of a length of the magnet. The system also includes one or more integrated circuits comprising one or more magnetic field sensing elements arranged in a substantially linear array, wherein the one or more magnetic field sensing elements are positioned within the substantially uniform flux of the magnetic field.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

Figure 1:
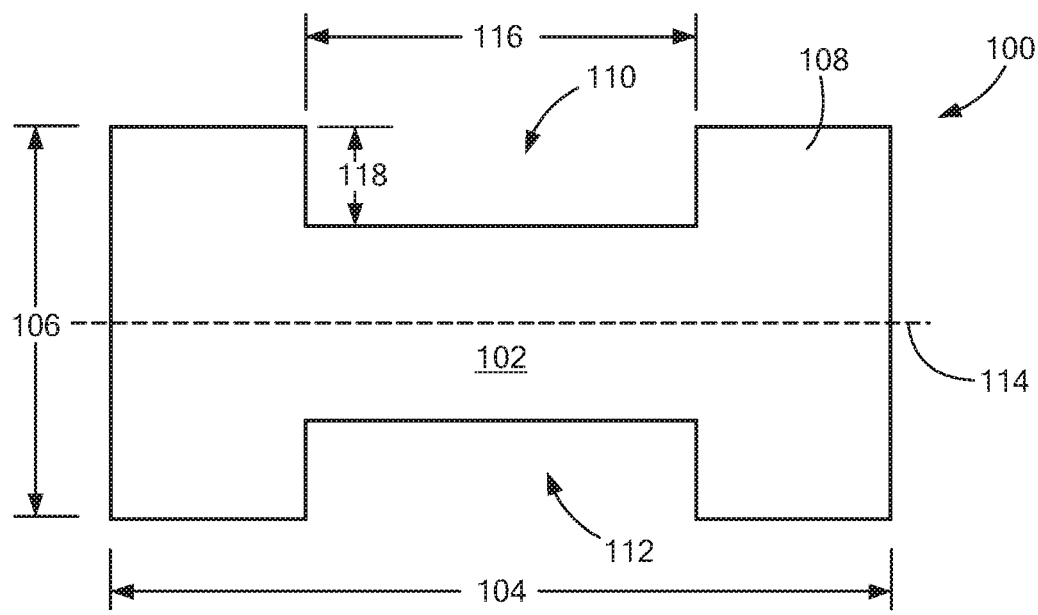
FIG. 1 is a diagram of an embodiment of a shaped magnet.

As used herein, the term "magnetic field sensing element" is used to describe a variety of electronic elements that can sense a magnetic field. The magnetic field sensing element can be, but is not limited to, a Hall Effect element, a magnetoresistance element, or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, a magnetic tunnel junction (MTJ), a spin-valve, etc. The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR, spin-valve) and vertical Hall elements tend to have axes of sensitivity parallel to a substrate.

It will be appreciated by those of ordinary skill in the art that while a substrate (e.g. a semiconductor substrate) is described as "supporting" the magnetic field sensing element, the element may be disposed "over" or "on" the active semiconductor surface, or may be formed "in" or "as part of" the semiconductor substrate, depending upon the type of magnetic field sensing element. For simplicity of explanation, while the embodiments described herein may utilize any suitable type of magnetic field sensing elements, such elements will be described here as being supported by the substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the term "target" is used to describe an object to be sensed or detected by a magnetic field sensor or magnetic field sensing element. A target may be ferromagnetic or magnetic.

As is known in the art, magnetic fields have direction and strength. The strength of a magnetic field can be described as magnetic flux or flux density. Therefore, the terms magnetic field "strength" and magnetic "flux" may be used interchangeably in this document.

FIG. 1 is a top view of a magnet 100, which has a body 102 with length 104 and width 106. Body 102 may be formed from a hard ferromagnetic material, or other material that allows magnet 100 to be permanently magnetized. In other embodiments, Body 102 may be a soft magnetic material that becomes magnetized when subjected to an external magnetic field. Body 102 may also be an electromagnetic circuit or device that produces a magnetic field when excited by electrical energy.

Magnet 100 is magnetized in a direction substantially perpendicular to a plane defined by its length and width so that the direction of magnetization points either into or out of the page. In other words, the top surface 108 may act as the north pole of the magnet, and the opposite bottom surface (which is not visible in FIG. 1) may act as the south pole of the magnet, or vice versa.

The body 102 has a notch or cutout 110 in one side to help produce a substantially uniform magnetic field, e.g. a magnetic field with substantially uniform flux density, along at least a portion of the length 104 of magnet 100. Notch 110 may be a rectangular notch extending along at least a portion of the length 104 of magnet 100. A second notch 112 may extend along the opposite side of magnet 100. The second notch 112 may be symmetrical to notch 110, i.e. the second notch 112 may be a mirror image of notch 110. The notches 110 and 112 may be positioned in the center of body 102, centered along length 104, so that body 102 has an "H" shape.

As used here, the term "notch" refers to a void and/or absence of material in the otherwise continuous surfaces and/or body 102 of magnet 100. Notches 110 and 112 can have angular and/or curved surfaces and may have various shapes, such as a rectangular shape, a V or triangular shape, a D or U or other circular or semi-circular shape, or any other shape. Notches 110 and 112 can be formed by molding or sintering body 102 to form a shape having notches 110 and 112, by mechanically tooling, machining, or cutting magnet 100 to create notches 110 and 112, or by any other appropriate means of forming notches 110 and 112 in body 102.

Figure 5:
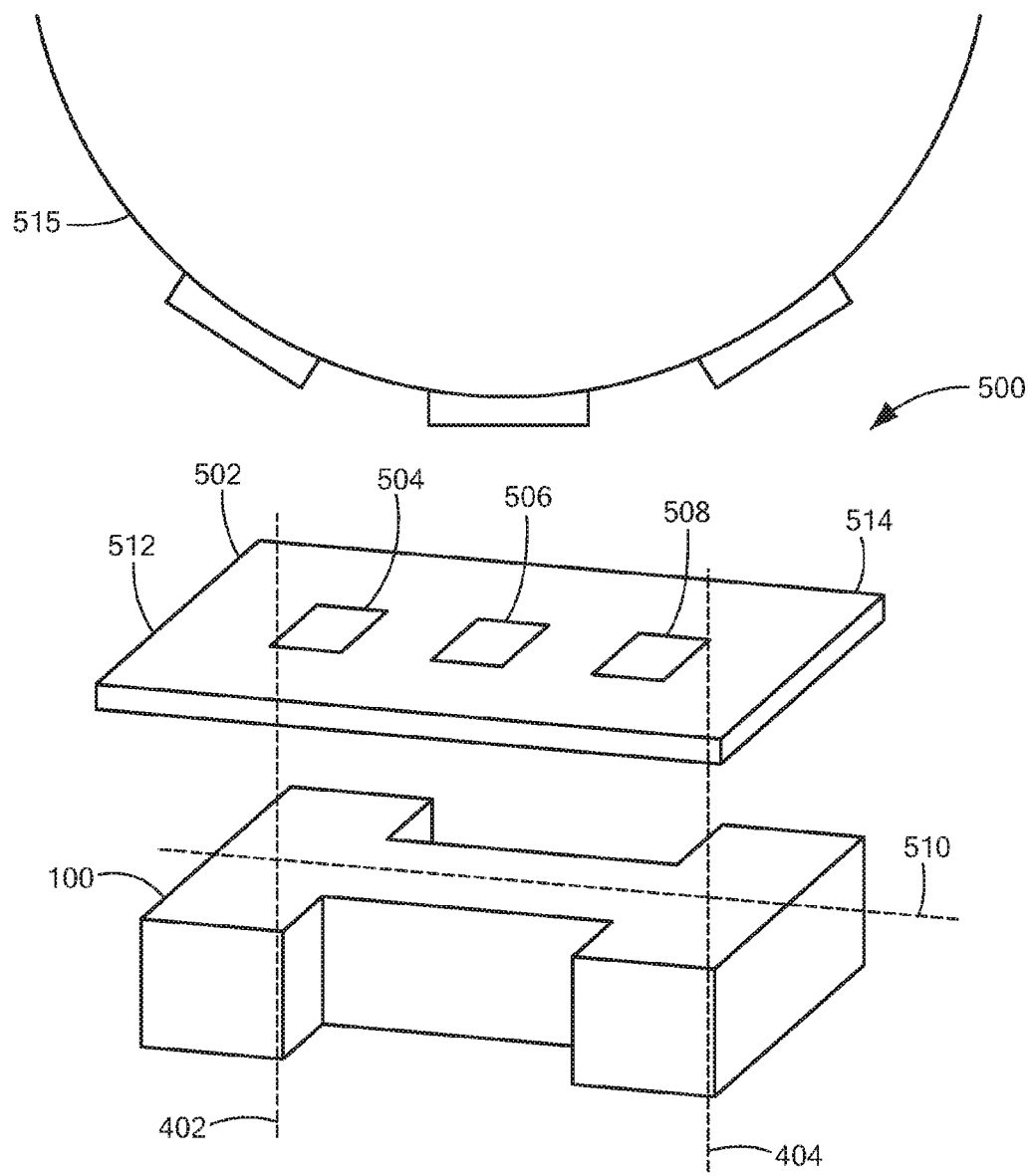
FIG. 5 is an isometric view of a magnetic field sensor system including a shaped magnet.

In an embodiment, length 104 of magnet 100 is about 4 mm and width 106 is about 3.5 mm. To form a uniform magnetic field, length 116 of notches 110 and 112 may be about 2 mm and width 118 of the notches may be about 0.857 mm. Magnet 100 may also have a height (e.g. a dimension going into the page in FIG. 1), which may be between about 2 mm and about 4 mm. In one embodiment the height is about 2.75 mm. The notches 110 and 112 may extend through the entire height of the magnet so that the magnet has an H shape as shown in FIG. 1 and FIG. 5, for example. Alternatively, the notches 110 and 112 or may extend part way through the height of the magnet so that the notches form a cutout or step in the body of the magnet.

In some embodiments, magnet 100 may have a single notch 100 in one side, or may have two symmetrical notches in opposite sides, or may have non-symmetrical notches. If the notches are non-symmetrical, they may have different lengths 116, different depths 118, or may be positioned in a non-centered position with respect to length 104 of magnet 100. Additionally or alternatively, non-symmetrical notches may have different geometrical shapes—e.g. one notch may be rectangular and the other triangular or semi-circular, for example. In all cases, the shape of the notches, including its length, width, height, and geometrical shape, may be optimized to produce a substantially uniform magnetic field along at least a portion of the length 104 of magnet 100.

Body 102 can include sintered or bonded materials, and can be manufactured by injection molding, sintering, electric discharge machining, mechanical machining, or other methods.

The presence of notch 110 and/or 112 affects the magnetic circuit (i.e. the path of magnetic flux) in the area of notch 110 and 112 by providing a path, through the notch, for the magnetic flux to travel. This reduces the length of the path that the magnetic flux must travel outside of the body 102 (i.e., through air) and, effectively, reduces the local reluctance of the magnetic circuit. This, in effect, shapes the magnetic field produced by magnet 100 so that the magnetic field has a substantially uniform strength along at least a portion of length 104. In particular, the notches 110 and 112 allow magnet 100 to produce a magnetic field with substantially uniform flux along at least a portion of centerline 114. If magnet 100 has a single notch or non-symmetrical notches, the region of the magnetic field that has substantially uniform strength may be offset or skewed with respect to centerline 114 in certain embodiments.

Figure 2:
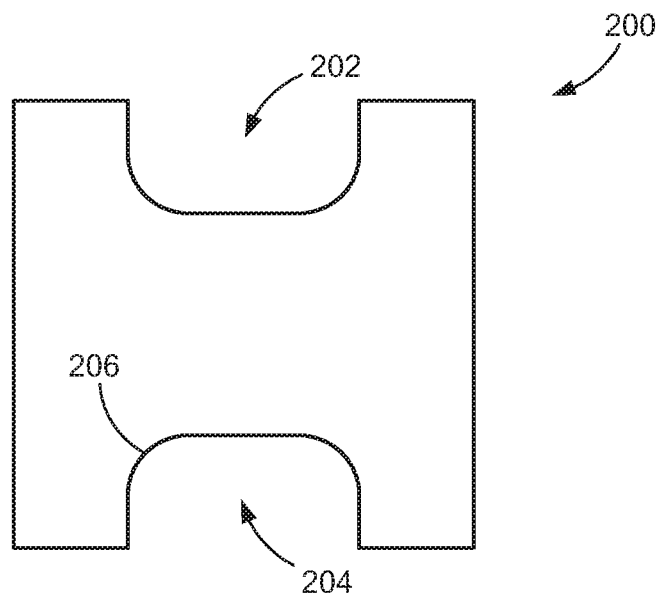
FIG. 2 is a diagram of another embodiment of a shaped magnet.

FIG. 2 is a top view of a magnet 200, which may be the same as or similar to magnet 100. Magnet 200 has a notch 202 in one side and a notch 204 in the opposite side. Notches 202 and 204 may have rounded inner corners (see, for example, inner corner 206). The rounded corners 206 may facilitate manufacturing of magnet 200. For example, if magnet 200 is molded or sintered, the rounded corners 206 may ease removal of magnet 200 from the mold. If notches 202 and 204 are cut or punched, the rounded corners 206 may allow for a cutting process that minimizes burrs or other sharp corners, or that uses less expensive cutting equipment or processes.

Figure 3:
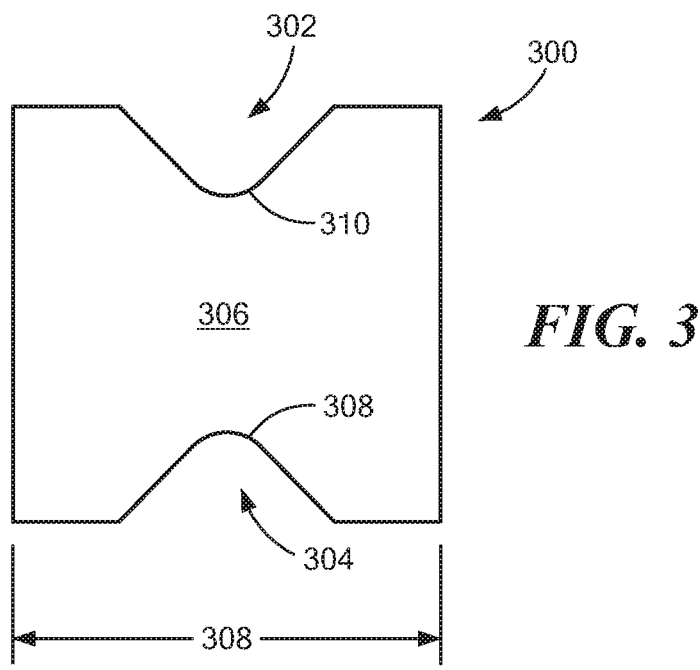
FIG. 3 is a diagram of another embodiment of a shaped magnet.

FIG. 3 is a top view of a magnet 300, which may be the same as or similar to magnet 100. Magnet 300 has a substantially triangular shaped notch 302 in one side and a triangular notch 304 in the opposite side. The triangular shape of notches 302 and 304 may also facilitate manufacturing of magnet 300. For example, if magnet 300 is molded or sintered, the triangular shape of notches 302 and 304 and/or the rounded corners 308, 310 at the apex of the notches, may ease removal of magnet 300 from the mold. If notches 302 and 304 are cut or punched, the triangular shape may allow for a cutting process that minimizes burrs or other sharp corners, or that uses less expensive cutting equipment or processes. In an embodiment, magnet 300 may have a single triangular notch 302 in one side instead of the two, symmetrical notches shown in FIG. 3.

Like the rectangular notches shown in FIG. 1 and FIG. 2, triangular notches 302 and 304 may affect the magnetic circuit in and around the area of triangular notches 302 and 304. This, in effect, can shape the magnetic field produced by magnet 300 so that the magnetic field has a substantially uniform strength along at least a portion of the length 308 of magnet 300. The triangular cutouts may result in a magnetic field having a different shape or strength than that of the rectangular cutouts. However, the triangular cutouts may facilitate manufacturing of magnet 300 in certain instances.

Figure 4:
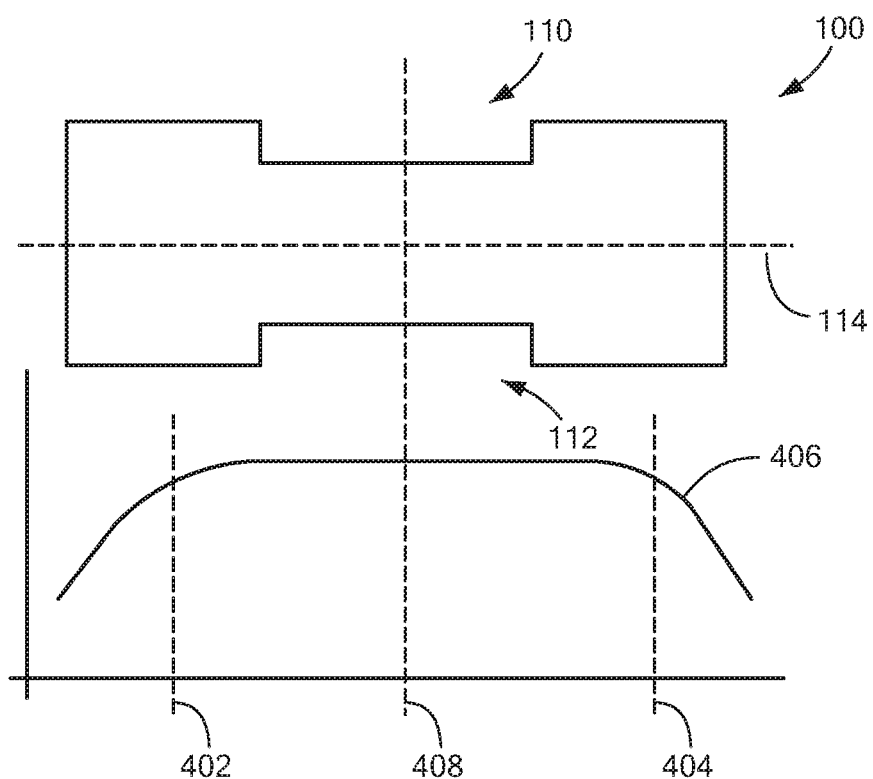
FIG. 4 is a diagram of a shaped magnet showing a graph of magnetic flux of the shaped magnet.

FIG. 4 shows the magnet 100 of FIG. 1 with respect to a plot of the magnetic flux density 406 at centerline 114. The vertical axis of the plot represents magnetic flux density and the horizontal axis represents distance along centerline 114. The mid-point of the length 104 of the magnet 100 is represented by dotted line 408. Due to the presence of notches 110 and 112, the magnetic flux density curve 400 has a substantially flat section between positions 402 and 404. If notches 110 and 112 are centered along the length of magnet 100 as shown in FIG. 4, the flat section of the magnetic flux between positions 402 and 404 may also be centered along the length of magnet 100.

The flat section of magnetic flux curve 406 corresponds to a substantially uniform magnetic field strength produced by magnet 100 between positions 402 and 404. If the magnetic field sensing elements are arranged so they are placed along the centerline between positions 402 and 404, then the magnetic field sensing elements will be exposed to a substantially uniform magnetic field between those positions. If the magnetic field produced by magnet 100 is used, for example, as a biasing field in a particular application, then each of the magnetic field sensing elements placed between positions 402 and 404 will be exposed to a uniform bias field. Thus, because the bias field can cause a DC offset in the output signal of the magnetic field sensors, the uniform bias field will result in each of the magnetic field sensing elements having the same or similar DC offsets.

FIG. 5 is an isometric view of a magnetic field sensor 500. Magnetic field sensor 500 includes a substrate 502 supporting one or more magnetic field sensing elements 504, 506, and 508. Substrate 502 may, in some embodiments, be a semiconductor substrate and may also include other circuits (not shown) used to detect a target, including, but not limited to: processors, amplifiers, comparators, power circuits, etc. Magnet 100 is placed adjacent to substrate 502 to act as a bias magnet. In other words, the magnetic field produced by magnet 100 produces a bias field used to detect relative movement of a target 515 by magnetic field sensors 504, 506, and 508. As noted above, magnet 100 produces a magnetic field (in this application a magnetic bias field) with a substantially uniform magnetic field strength between positions 402 and 404.

As shown in FIG. 5, magnetic field sensing elements 504, 506, and 508 are arranged on substrate 502 in a substantially linear array along the centerline 510 of magnet 100 within. Magnetic field sensing elements 504, 506, and 508 are also arranged so that the distance between magnetic field sensing element 504 and magnetic field sensing element 508 is less than or equal to the distance between position 402 and position 404. In other words, magnetic field sensing elements are arranged close enough together so that the array can fit within the portion of the magnetic field produced by magnet 100 that has uniform magnetic field strength.

In an embodiment, magnet 100 is placed relative to substrate 502 so that magnetic field sensing elements 504, 506, and 508 fall within the substantially uniform portion of the magnetic field produced by magnet 100. In an embodiment, the distance between magnetic field sensing element 504 and magnetic field sensing element 508 is less than the distance between positions 402 and 404. This allows for tolerance in placement of magnet 100 during manufacturing. In such an embodiment, magnetic field sensing elements 504, 506, and 508 can still fall within the uniform portion of the magnetic field produced by magnet 100 even if magnet 100 is placed slightly left, toward end 512, or slightly right, toward end 514, during placement.

Although shown as having three magnetic field sensing elements, integrated substrate 502 may support one, two, three, or more than three magnetic field sensing elements. The magnetic field sensing elements can be arranged in a linear array, a grid, or any other pattern so long as the magnetic field sensing elements can be placed within the substantially uniform portion of the magnetic field produced by magnet 100.

In an embodiment, magnet 100 may be placed so that substrate 502 is between magnet 100 and a target 515 also shown. In another embodiment, magnet 100 may be placed between integrated circuit 512 and target 515. In these embodiments, magnet 100 may be positioned so that magnetic field sensing elements 504, 506, and 508 fall within the substantially uniform portion of the magnetic bias field produced by magnet 100.

Whether magnetic field sensing elements 504, 506, and 508 are Hall Effect elements or GMR elements may also affect the placement of magnet 100 relative to magnetic field sensing elements 504, 506, and 508. If the magnetic field sensing elements are Hall Effect elements, magnet 100 may be positioned so the magnetic field (i.e. the magnetic field lines) produced by magnet 100 is substantially perpendicular to a surface of the magnetic field sensing elements. If the magnetic field sensing elements are GMR elements, magnet 100 may be positioned so the magnetic field produced by magnet 100 is substantially parallel to the surface of the magnetic field sensing elements. In either case, magnet 100 may be positioned so that magnetic field sensing elements 504, 506, and 508 are located within a substantially uniform portion of the magnetic field produced by magnet 100.

Figure 6A:
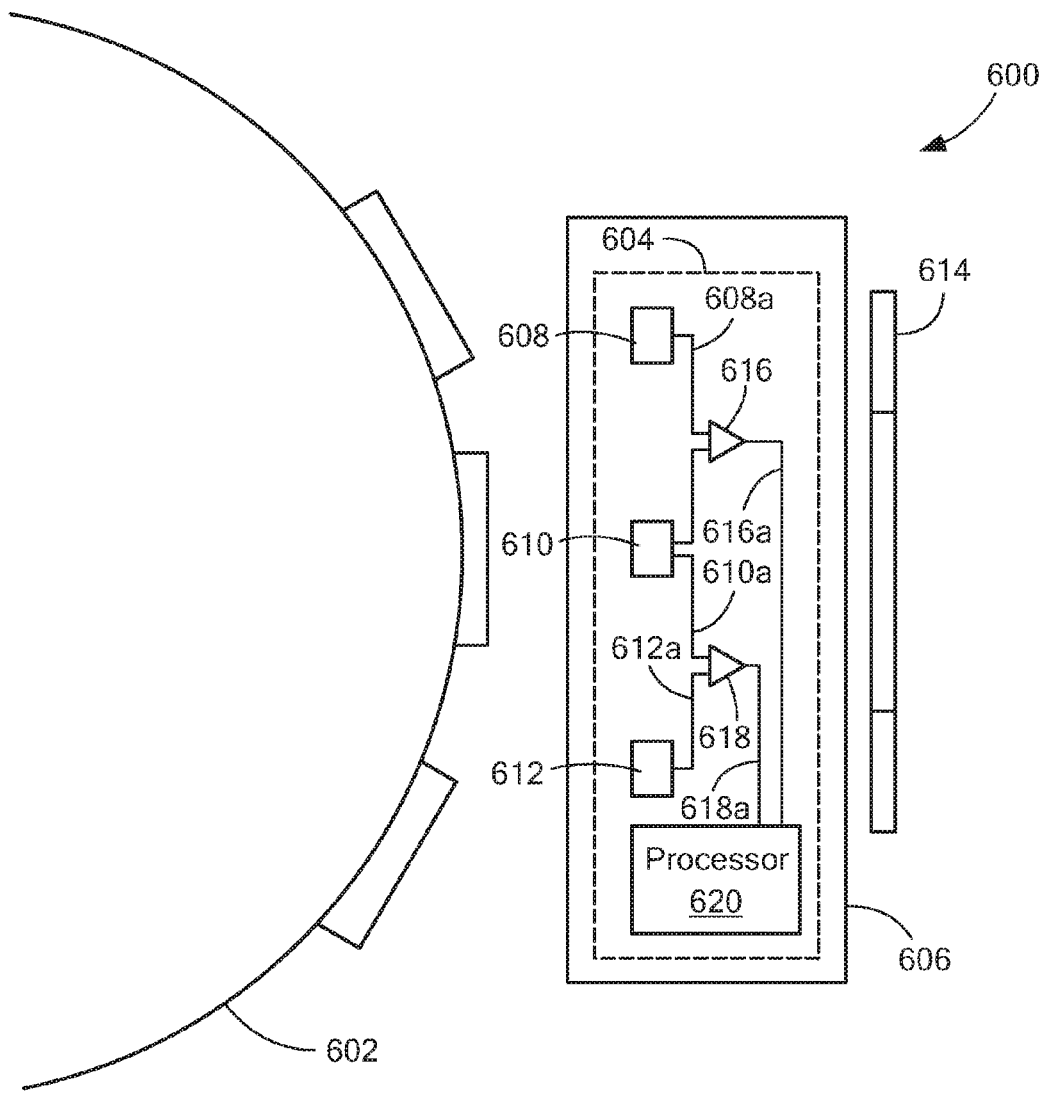
FIG. 6A and FIG. 6B are block diagrams of a magnetic field sensor system including a shaped magnet.

Referring now to FIG. 6A, a system 600 for detecting a target 602 includes an integrated circuit package 606 containing a substrate 604. Substrate 604 may be the same as or similar to substrate 502, and may support magnetic field sensing elements 608, 610, and 612, which may be the same as or similar to magnetic field sensing elements 504, 506, and 508. System 600 also includes a magnet 614, which may be the same as or similar to magnet 100, 200, 300, or other magnets described above.

Package 606 may be any appropriate integrated circuit package type including, but not limited to: a SIP, DIP, surface mount, chip carrier, PGA, flat pack, BGA, chip-on-board, etc. Accordingly, package 606 may include one or more lead frames, lead wires, and leads (not shown) to provide an interface to the circuitry supported by substrate 502. In certain embodiments, integrated circuit package 606 may contain multiple substrates.

In an embodiment, integrated circuit 606 may include comparators 616 and 618. Comparator 616 is coupled to receive signal 608a from magnetic field sensing element 608 and signal 610a from magnetic field sensing element 610. Signals 608a and 610a may represent the magnetic field detected by magnetic field sensing elements 608 and 610, respectively. Comparator 618 is coupled to receive signal 610a from magnetic field sensing element 610 and signal 612a from magnetic field sensing element 612. Signals 610a and 612a may represent the magnetic field detected by magnetic field sensing elements 610 and 612, respectively.

Integrated circuit 606 also includes a processor circuit 620, which is coupled to receive signal 616a from comparator 616 and signal 618a from comparator 618. Signal 616a represents a difference between signals 608a and 610a, and signal 618a represents a difference between signals 610a and signal 612a. Signals 616a and 618a can take various forms such analog or digital signals.

Processor 620 includes circuits capable of computing the speed, position, and/or direction of rotation of target 602 based on signals 616a and signal 618a.

Magnet 614 may be affixed to an outside surface of integrated circuit package 606. For example, as shown in FIG. 6A, magnet 614 may be positioned on a surface of package 606 so that magnetic field sensing elements 608, 610, and 612 are located between magnet 614 and target 602 during operation. An adhesive can be used to attach magnet 614 to surface 606. Alternatively or additionally, package 606 may have an indentation or groove that can fit magnet 614, to secure magnet 614 in place and to help align magnet 614 with respect to magnetic field sensing elements 608, 610, and 612 during manufacturing.

Figure 6B:
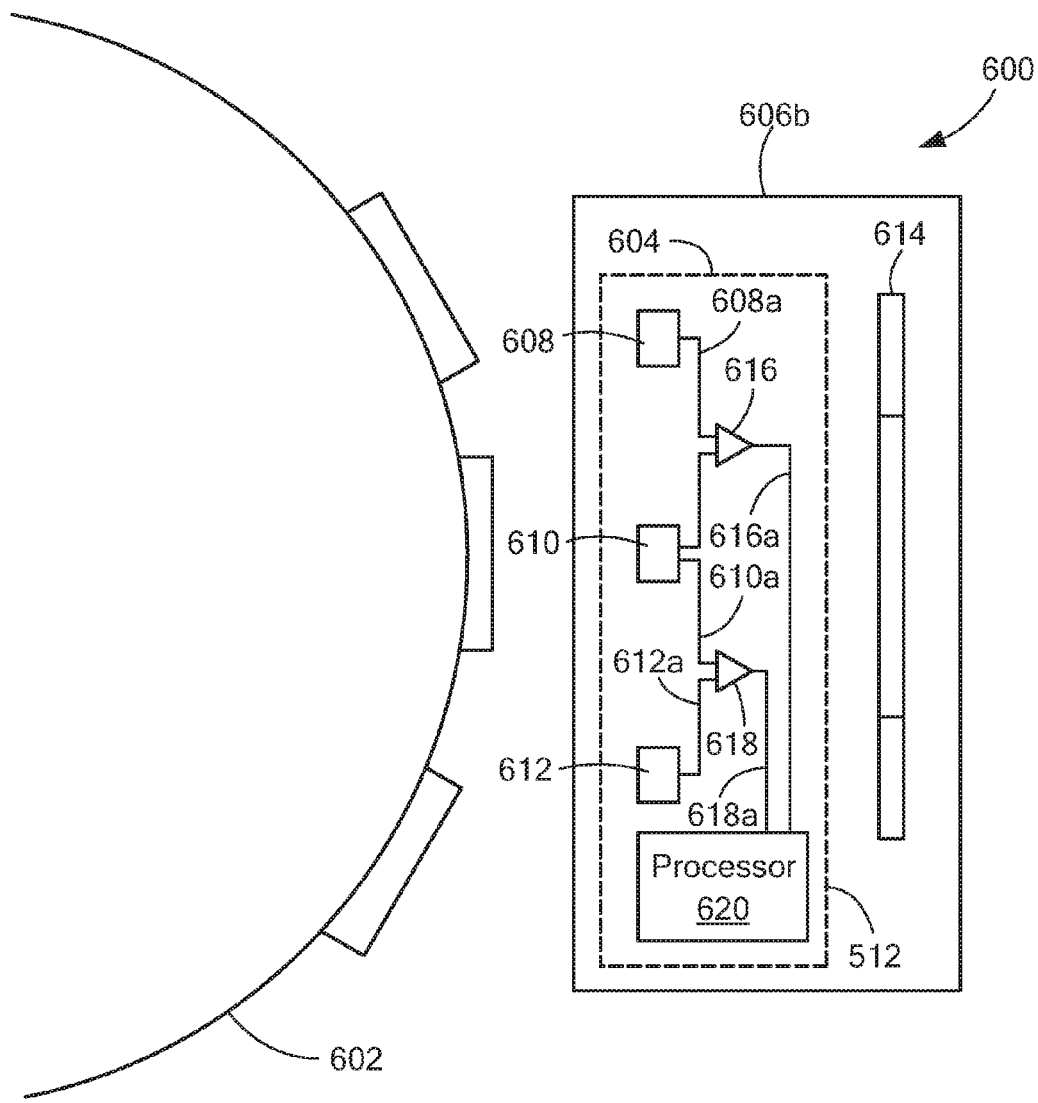

Referring to FIG. 6B, both substrate 604 and magnet 614 can be contained within the same integrated package (e.g. package 606b). Similarly to the arrangement of magnet 614 shown in FIG. 6A, magnet 614 may be arranged within package 606b so that magnetic field sensing elements 608, 610, and 612 are located between magnet 614 and target 602. However, magnet 614 may also be arranged within package 606b so that magnet 614 is on a side of integrated circuit 604, or between integrated circuit 604 and target 602.

In yet another embodiment, magnet 614 may be mounted separately to package 606b (i.e. not affixed to or contained within package 606 or 606b). Whether magnet 614 is mounted separately, affixed to an outside surface of the package, or encapsulated within the package, magnet 614 may be positioned so that magnetic field sensing elements 608, 610, and 612 are located within the magnetic field produced by magnet 614. In particular, magnet 614 can be positioned so that magnetic field sensing elements 608, 610, and 612 are positioned within the portion of the magnetic field produced by magnet 614 that has substantially uniform strength.

To achieve this positioning, magnet 614 can be centered with respect to the array of magnetic field sensing elements 608, 610, and 612 so that magnetic field sensing elements 608, 610, and 612 lie within the portion of the magnetic field produced by magnet 614 that has substantially uniform strength (e.g. so that magnetic field sensing elements lie between positions 402 and 404 of magnetic flux curve 406 in FIG. 4). Thus, magnetic field sensing elements 608, 610, and 612 may each be exposed to the same magnetic bias field (i.e. a magnetic bias field with the same strength).

Placing the magnetic field sensing elements 608, 610, and 612 within a substantially uniform magnetic bias field can reduce processing circuitry required to process signals 616a and 618a. The magnetic bias field that magnetic field sensing elements 608, 610, and 612 are exposed to affects the output of magnetic field sensing elements 608, 610, and 612. If the magnetic bias field is non-uniform across the magnetic field sensing elements, then the DC offset may be different for the different magnetic field sensing elements. These signal variations (due to a non-uniform magnetic bias field) will manifest in signals 616a and 618a. Thus, conventional circuitry would be required to compensate for the signal variation caused by a non-uniform bias field. Or, as noted above, a concentrator would be used to compensate for bias field non-uniformities, thereby adding cost and reducing the minimum possible air gap. If the magnetic bias field is substantially uniform, as is achieved with the described shaped magnets, the need for additional processor circuitry and/or a concentrator is advantageously eliminated.

What is claimed is:

1. A magnetic field sensor comprising:
   a magnet comprising:
      a magnetic body having a length and width;
      a first triangular notch in a first side of the body and extending along a portion of the length of the body; and
      a second triangular notch in an opposite side of the body extending along portion of the length of the body, wherein a length of the first and second triangular notch is less than the length of the body and a magnetic field produced by the body has a substantially uniform magnetic flux along at least a portion of the length of the body; and
   three magnetic field sensing elements arranged in a linear array positioned such that each of the three magnetic field sensing elements is positioned within the area of substantially uniform magnetic flux.

2. The magnetic field sensor of claim 1 wherein the first and second notches are centered along the length of the body.

3. The magnetic field sensor of claim 1 wherein the body has a magnetic orientation perpendicular to a plane defined by the length and width of the body.

4. An apparatus comprising:
   a magnet comprising:
      a magnetic body having a length and width;
      a first triangular notch in a side of the body and extending along at least a portion of the length of the body; and
      a second triangular notch in an opposite side of the body extending along at least a portion of the length of the body, wherein a length of the first triangular notch and a length of the second triangular notch are less than the length of the body and a magnetic field produced by the body has a substantially uniform magnetic flux along at least a portion of the length of the body; and one or more magnetic field sensing elements positioned within the substantially uniform magnetic flux.

5. The apparatus of claim 4 wherein at least one of the magnetic field sensing elements is a Hall Effect element.

6. The apparatus of claim 4 wherein at least one of the magnetic field sensing elements is a magnetoresistive element.

7. The apparatus of claim 6 wherein the magnetoresistive element is selected from the list consisting of: an Indium Antimonide element, a giant magnetoresistance (GMR) element, an anisotropic magnetoresistance element (AMR), a tunneling magnetoresistance (TMR) element, a magnetic tunnel junction (MTJ), a spin-valve element, and a combination thereof.

8. A system comprising:

a magnet having a shaped body; and one or more substrates supporting one or more magnetic field sensing elements arranged in a substantially linear array, wherein the one or more magnetic field sensing elements is positioned within the substantially uniform flux of the magnetic field;

wherein the shaped body comprises:

a first triangular notch in a side of the body and extending along a portion of the length of the body; and a second triangular notch in an opposite side of the body extending along a portion of the length of the body, wherein a length of the first triangular notch and a length of the second triangular notch are less than the length of the body and a magnetic field produced by the body has a substantially uniform magnetic flux along at least a portion of the length of the body.

9. The system of claim 8 further comprising an integrated circuit package containing the one or more substrates, wherein the magnet is coupled to an outside surface of the integrated circuit package.

10. The system of claim 8 further comprising an integrated circuit package containing the one or more substrates, wherein the magnet is positioned within the integrated circuit package.

11. The system of claim 8 wherein the first and second notches are centered along the length of the body.

12. The system of claim 8 wherein the magnet has a magnetic orientation substantially perpendicular to the length and width of the magnetic body.

13. The system of claim 8 wherein the first and second notches have rounded interior corners.

14. The system of claim 8 wherein the one or more magnetic field sensing elements produce respective magnetic field signals, and the system produces at least one output signal representing a combination of signals produced by adjacent magnetic field sensing elements.

15. The system of claim 14 further comprising a processor coupled to receive the output signal and determine proximity, speed, direction or a combination thereof, of a target sensed by the magnetic field sensing elements.

* * * * *

UNITED STATES PATENT AND TRADEMARK OFFICE
CERTIFICATE OF CORRECTION

PATENT NO. : 9,583,247 B2
APPLICATION NO. : 14/287469
DATED : May 27, 2014
INVENTOR(S) : Paul A. David et al.

Page 1 of 1

It is certified that error appears in the above-identified patent and that said Letters Patent is hereby corrected as shown below:

In the Specification

Column 1, Line 39, delete "airgap)." and replace with --air gap).--

Column 3, Line 52, delete "Body 102" and replace with --body 102--

Column 4, Line 28, delete "one embodiment" and replace with --one embodiment,--

Column 4, Line 32, delete "112 or may" and replace with --112 may--

Column 5, Line 44, delete "curve 400" and replace with --curve 406--

Column 7, Line 35, delete "forms such analog or digital" and replace with --forms such as analog or digital--

Column 8, Line 42, delete "extending along portion" and replace with --extending along a portion--

Signed and Sealed this
Twentieth Day of February, 2018

Andrei Iancu
*Director of the United States Patent and Trademark Office*